US012304034B2

(12) United States Patent
Carlson et al.

(10) Patent No.: US 12,304,034 B2
(45) **Date of Patent: *May 20, 2025**

(54) IMPACT TOOL WITH COLLAPSIBLE MEMBER TO COMPENSATE FOR THERMAL EXPANSION

(71) Applicant: MILWAUKEE ELECTRIC TOOL CORPORATION, Brookfield, WI (US)

(72) Inventors: Mitchell Carlson, Lisbon, WI (US); Ding Feng Hu, Dongguan (CN); Zhiqiang Yu, Dongguan (CN); Fanbin Zeng, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,466

(22) Filed: Feb. 12, 2024

(65) Prior Publication Data

US 2024/0181609 A1 Jun. 6, 2024

Related U.S. Application Data

(63) Continuation of application No. 17/408,898, filed on Aug. 23, 2021, now Pat. No. 11,897,095, which is a (Continued)

(51) Int. Cl.
*B25B 21/02* (2006.01)
*B25F 5/02* (2006.01)

(52) U.S. Cl.
CPC .............. *B25B 21/026* (2013.01); *B25F 5/02* (2013.01)

(58) Field of Classification Search
CPC ................................ B25B 21/026; B25F 5/02
See application file for complete search history.

(56) References Cited

U.S. PATENT DOCUMENTS 2,285,638 A * 6/1942 Amtsberg ................. F16D 5/00 173/93.5
2,285,639 A * 6/1942 Amtsberg ................. F16D 5/00 173/93.5

(Continued)

FOREIGN PATENT DOCUMENTS

CA 2146577 A1 10/1995
CA 2193728 A1 12/1995

(Continued)

OTHER PUBLICATIONS

International Search Report and Written Opinion for Application No. PCT/US2017/048626 dated Nov. 7, 2017 (16 pages).

*Primary Examiner* — Lucas E. A. Palmer
(74) *Attorney, Agent, or Firm* — Michael Best & Friedrich LLP

(57) ABSTRACT

An impact power tool includes a motor, an output shaft to which a tool bit is attachable for performing work on a workpiece, and an impact mechanism disposed between the motor and the output shaft for converting a continuous torque output from the motor to discrete pulses of torque upon the output shaft, the impact mechanism including a cylinder assembly, a cavity defined within the cylinder assembly containing a hydraulic fluid, and a collapsible member having a first end and a second end opposite the first end. The collapsible member is maintained in a shape coinciding with that of the cavity by fitment within the cavity, with the first and second ends being disconnected from each other. The collapsible member is collapsible to compensate for thermal expansion of the hydraulic fluid during operation of the impact mechanism.

20 Claims, 6 Drawing Sheets

Related U.S. Application Data continuation of application No. 16/309,625, filed as application No. PCT/US2017/048626 on Aug. 25, 2017, now Pat. No. 11,097,403.

(60) Provisional application No. 62/379,393, filed on Aug. 25, 2016.

(56) References Cited

U.S. PATENT DOCUMENTS 3,179,219 A * 4/1965 Karden ................. B25B 21/026 173/93.5
3,263,449 A 8/1966 Kramer
3,319,723 A 5/1967 Kramer
3,533,479 A * 10/1970 Albertson ............. B25B 21/026 173/93.5
3,714,994 A 2/1973 Zoerner et al.
3,789,934 A * 2/1974 Schoeps ................ B25B 21/026 173/93.5
3,841,193 A * 10/1974 Ito ........................... B25B 29/02 411/395
4,002,212 A * 1/1977 Schoeps .................. B25B 21/02 173/93.5
4,418,764 A 12/1983 Mizobe
4,533,337 A 8/1985 Schoeps
4,553,948 A 11/1985 Tatsuno
4,557,337 A * 12/1985 Shibata ................. B25B 21/026 173/93.5
4,635,731 A 1/1987 Wallace et al.
4,683,961 A 8/1987 Schoeps
4,735,595 A 4/1988 Schoeps
4,767,379 A 8/1988 Schoeps
4,823,627 A * 4/1989 Mills ....................... F16H 29/04 74/125.5
4,838,133 A 6/1989 Dainin
4,913,242 A 4/1990 Lo
4,920,836 A 5/1990 Sugimoto et al.
4,967,852 A 11/1990 Tatsuno
5,080,180 A 1/1992 Hansson
5,092,410 A 3/1992 Wallace et al.
5,181,575 A 1/1993 Maruyama et al.
5,355,748 A 10/1994 Ito et al.
5,366,026 A 11/1994 Maruyama et al.
5,544,710 A 8/1996 Groshans et al.
5,645,130 A 7/1997 Schoeps
5,704,434 A 1/1998 Schoeps
5,735,354 A 4/1998 Weidner et al.
5,741,186 A 4/1998 Tatsuno
5,775,439 A 7/1998 Biek
5,802,850 A * 9/1998 Kimura ..................... F15B 1/02 60/479
6,110,045 A 8/2000 Schoeps
6,179,063 B1 1/2001 Borries et al.
6,311,787 B1 11/2001 Berry et al.
6,334,494 B1 1/2002 Nagato
6,505,690 B2 1/2003 Tokunaga
6,598,684 B2 7/2003 Watanabe
6,599,197 B2 7/2003 Tatsuno
6,607,041 B2 8/2003 Suzuki et al.
6,680,595 B2 1/2004 Ito
6,687,567 B2 2/2004 Watanabe
6,708,778 B2 3/2004 Tokunaga
6,771,043 B2 8/2004 Matsunaga et al.
6,968,908 B2 11/2005 Tokunaga et al.
6,983,808 B1 1/2006 Chen
7,032,685 B2 4/2006 Nakamizo
7,036,605 B2 5/2006 Suzuki et al.
7,048,075 B2 5/2006 Saito et al.
7,109,675 B2 9/2006 Matsunaga et al.
7,216,723 B2 5/2007 Ohtsu et al.
7,237,622 B2 * 7/2007 Liao ...................... F01C 1/3446 173/104
7,334,648 B2 2/2008 Arimura
7,455,121 B2 11/2008 Saito et al.
7,647,986 B2 * 1/2010 Kettner ................... B25B 21/02 173/104
7,699,118 B2 4/2010 Setter et al.
7,703,546 B2 * 4/2010 Kettner ................... B25B 21/02 173/208
7,770,658 B2 8/2010 Ito et al.
7,896,098 B2 3/2011 Suzuki et al.
7,990,005 B2 8/2011 Walter et al.
8,210,275 B2 7/2012 Suzuki et al.
8,302,701 B2 11/2012 Morimura et al.
8,338,997 B2 12/2012 Nishikawa
8,360,166 B2 1/2013 Iimura et al.
8,410,645 B2 4/2013 Lau
8,415,842 B2 4/2013 Lau
8,430,185 B2 4/2013 Uemura
8,607,892 B2 12/2013 Iimura et al.
8,640,789 B2 2/2014 Harada et al.
8,729,751 B2 5/2014 Telakowski et al.
8,857,535 B2 10/2014 Sugimoto
8,905,154 B2 * 12/2014 Uemura .............. B25B 23/1453 173/200
9,168,651 B2 * 10/2015 Hecht ................... F16D 43/206
11,097,403 B2 * 8/2021 Carlson ................. B25B 21/026
2001/0010268 A1 8/2001 Tokunaga et al.
2002/0035876 A1 3/2002 Donaldson, Jr.
2002/0134172 A1 9/2002 Yamada et al.
2006/0108133 A1 5/2006 Yamazaki
2009/0008117 A1 1/2009 Kettner
2009/0068936 A1 3/2009 Kuhnle et al.
2011/0073334 A1 * 3/2011 Iimura .................... B25B 21/02 173/217
2011/0073343 A1 3/2011 Sawano et al.
2011/0203822 A1 8/2011 Harada et al.
2011/0214894 A1 9/2011 Harada et al.
2011/0232930 A1 * 9/2011 Zhang ..................... B25F 5/001 173/178
2011/0303432 A1 * 12/2011 Stauffer .................. B25F 5/001 173/181
2012/0000684 A1 1/2012 Sugimoto
2012/0006573 A1 1/2012 Sugimoto
2012/0073846 A1 * 3/2012 Hirai ....................... B25B 21/02 173/200
2012/0132449 A1 * 5/2012 Hecht ..................... B25B 21/00 173/5
2013/0056237 A1 3/2013 Söderlund
2013/0075121 A1 * 3/2013 Nakamura .............. B25B 21/02 173/94
2013/0270051 A1 * 10/2013 Hecht ....................... B25F 5/02 192/38
2015/0231769 A1 8/2015 Golden et al.
2015/0343622 A1 12/2015 Chen
2017/0144277 A1 * 5/2017 Söderlund ............... B25B 21/02
2020/0023501 A1 * 1/2020 Bandy ..................... B25B 21/02
2022/0203512 A1 * 6/2022 Kondo ..................... H02K 7/14

FOREIGN PATENT DOCUMENTS

EP 1120199 B1 10/2008
EP 2246156 A1 11/2010
JP 2010269424 A 12/2010
JP 4834188 B1 * 12/2011
JP 2012161852 A 8/2012
JP 5128094 B2 1/2013
JP 2014240108 A 12/2014
JP 2015037734 A 2/2015
WO 2015181011 A1 12/2015

* cited by examiner

IMPACT TOOL WITH COLLAPSIBLE MEMBER TO COMPENSATE FOR THERMAL EXPANSION

CROSS-REFERENCE TO RELATED APPLICATIONS

This application is a continuation of U.S. patent application Ser. No. 17/408,898, filed Aug. 23, 2021, now U.S. Pat. No. 11,897,095, which is a continuation of U.S. patent application Ser. No. 16/309,625, filed on Dec. 13, 2018, now U.S. Pat. No. 11,097,403, which is a national phase of PCT Patent Application No. PCT/US2017/048626, filed on Aug. 25, 2017, which claims priority to U.S. Provisional Patent Application No. 62/379,393 filed on Aug. 25, 2016, the entire content of each of which is incorporated herein by reference.

FIELD OF THE INVENTION

The present invention relates to power tools, and more particularly to impact power tools.

BACKGROUND OF THE INVENTION

Impact power tools are capable of delivering rotational impacts to a workpiece at high speeds by storing energy in a rotating mass and transmitting it to an output shaft. Such impact power tools generally have an output shaft, which may or may not be capable of holding a tool bit. Rotational impacts can be transmitted through the output shaft using a variety of technologies, such as electric, oil-pulse, mechanical-pulse, or any suitable combination thereof.

SUMMARY OF THE INVENTION

The invention provides, in one aspect, a rotary power tool including a main housing and a transmission housing coupled to the main housing. The transmission housing includes a bearing pocket open to a front of the transmission housing and defined at least partially by a radially inward-extending flange. The rotary power tool also includes an output shaft, a bearing positioned within the bearing pocket adjacent and in abutting relationship with the radially inward-extending flange for rotatably supporting the output shaft in the transmission housing, and a radially outward-extending flange on the output shaft that radially overlaps at least a portion of the bearing on an opposite side of the bearing as the radially inward-extending flange. A line of action of an axial reaction force applied to the output shaft is directed to the transmission housing via the radially outwardly-extending flange, the bearing, and the radially inward-extending flange.

The invention provides, in another aspect, a rotary power tool comprising a main housing, a motor, and a transmission housing coupled to the main housing, the transmission housing including a bearing pocket open to a front of the transmission housing and defined at least partially by a radially inward-extending flange. The power tool also comprises an output shaft to which a tool bit is attachable for performing work on a workpiece and an impact mechanism disposed between the motor and the output shaft for converting a continuous torque output from the motor to discrete rotational impacts upon the output shaft, the impact mechanism including a cylinder concentrically disposed about the output shaft which receives torque from the motor. The power tool also comprises a bearing positioned within the bearing pocket adjacent and in abutting relationship with the radially inward-extending flange for rotatably supporting the output shaft in the transmission housing. The power tool further comprises a radially outward-extending flange on the output shaft that radially overlaps at least a portion of the bearing on an opposite side of the bearing as the radially inward-extending flange. A line of action of an axial reaction force applied to the output shaft is directed to the transmission housing via the radially outwardly-extending flange, the bearing, and the radially inward-extending flange and the cylinder imparts repeated rotational impacts upon the output shaft. A nominal axial clearance between a rear end of the output shaft and the cylinder is maintained in response to the application of the axial reaction force on the output shaft.

The invention provides, in yet another aspect, an impact power tool comprising, a main housing, a motor, and a transmission housing coupled to the main housing, the transmission housing including a radially inward-extending flange. The impact power tool further comprises an output shaft to which a tool bit is attachable for performing work on a workpiece and a bearing arranged in the transmission housing for rotatably supporting the output shaft in the transmission housing, wherein the bearing is in abutting relationship with the radially inward-extending flange. The impact power tool further comprises an impact mechanism disposed between the motor and the output shaft for converting a continuous torque output from the motor to discrete rotational impacts upon the output shaft and a radially outward-extending flange on the output shaft on an opposite side of the bearing as the radially inward-extending flange. The radially outward-extending flange is abutable with the bearing in response to a displacement of the output shaft that occurs in response to an application of an axial reaction force applied to the output shaft, such that a line of action of the axial reaction force applied to the output shaft is directed to the transmission housing via the radially outward-extending flange portion, the bearing, and the radially inward-extending flange.

The invention provides, in a further aspect, a rotary power tool including a motor, an output shaft to which a tool bit is attachable for performing work on a workpiece, and an impact mechanism disposed between the motor and the output shaft for converting a continuous torque output from the motor to discrete rotational impacts upon the output shaft. The impact mechanism includes a cylinder assembly concentrically disposed about the output shaft, a cavity defined within the cylinder assembly containing a hydraulic fluid, and a collapsible bladder having a first closed end, a second closed end opposite the first closed end, and an interior volume defined between the first and second closed ends and filled with a gas. The bladder is maintained in a shape coinciding with that of the cavity by fitment within the cavity, with the first and second closed ends being disconnected from each other. Each of the first and second closed ends is seamless.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
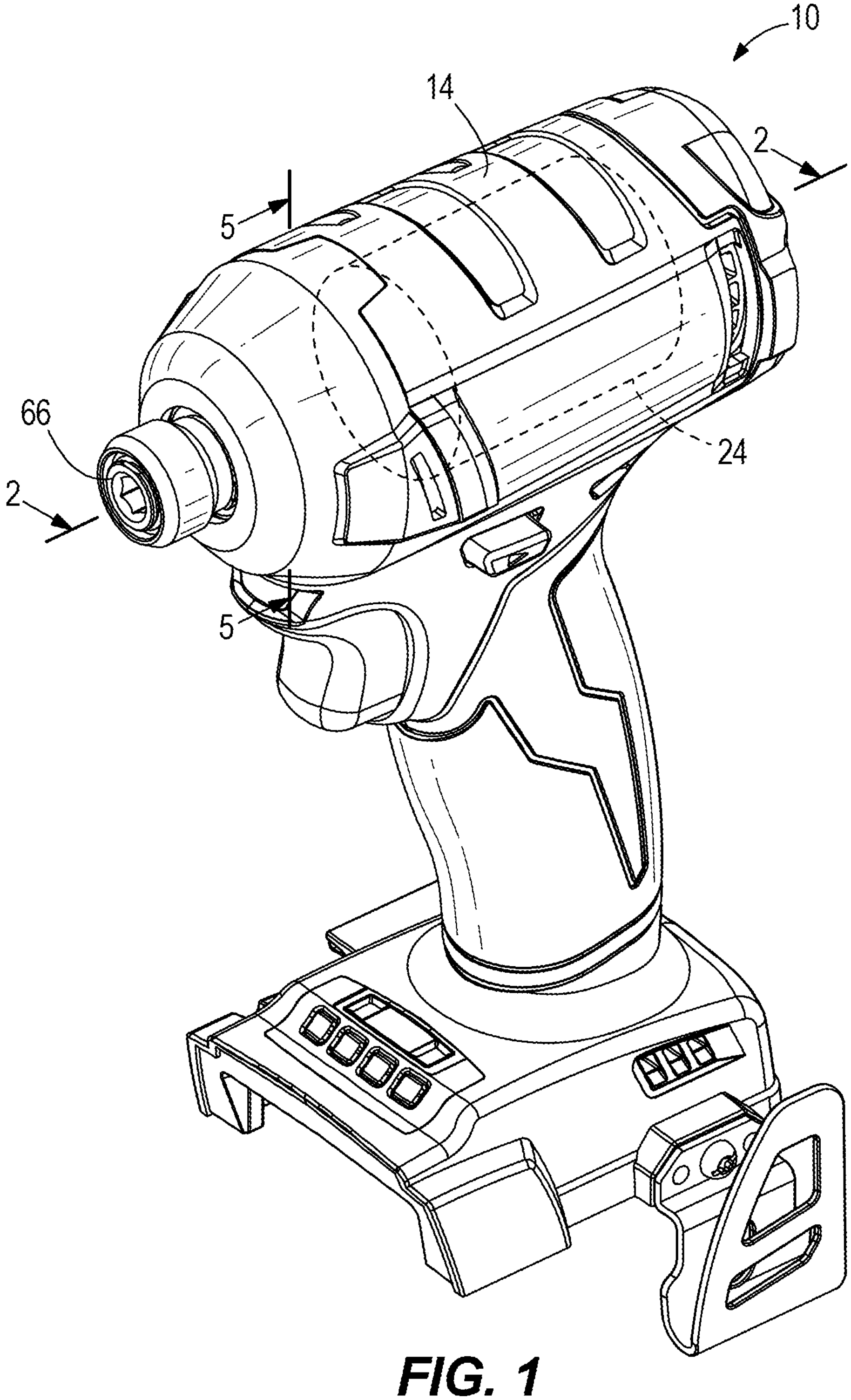
FIG. 1 is a front perspective view of an impact power tool in accordance with an embodiment of the invention.

With reference to FIG. 1 of the drawings, an impact power tool 10, or an impact driver, is shown. The impact driver 10 includes a main housing 14, a transmission housing 18 affixed to the main housing 14, and a hydraulic torque impact mechanism 22 (FIGS. 2 and 3) within the transmission housing 18. The impact driver 10 also includes an electric motor 24 (e.g., a brushless direct current motor) and a transmission (e.g., a single or multi-stage planetary transmission) positioned between the motor and the impact mechanism 22. The impact mechanism 22 includes a cylinder 26 coupled for co-rotation with an output of the transmission and is arranged to rotate within the transmission housing 18. Accordingly, the cylinder 26 is rotatable about a longitudinal axis 34 (FIG. 3) coaxial with the output of the transmission. The impact mechanism 22 also includes a camshaft 38, the purpose of which is explained in detail below, attached to the cylinder 26 for co-rotation therewith about the longitudinal axis 34. Although the camshaft 38 is shown as a separate component from the cylinder 26, the camshaft 38 may alternatively be integrally formed as a single piece with the cylinder 26.

Figure 4:
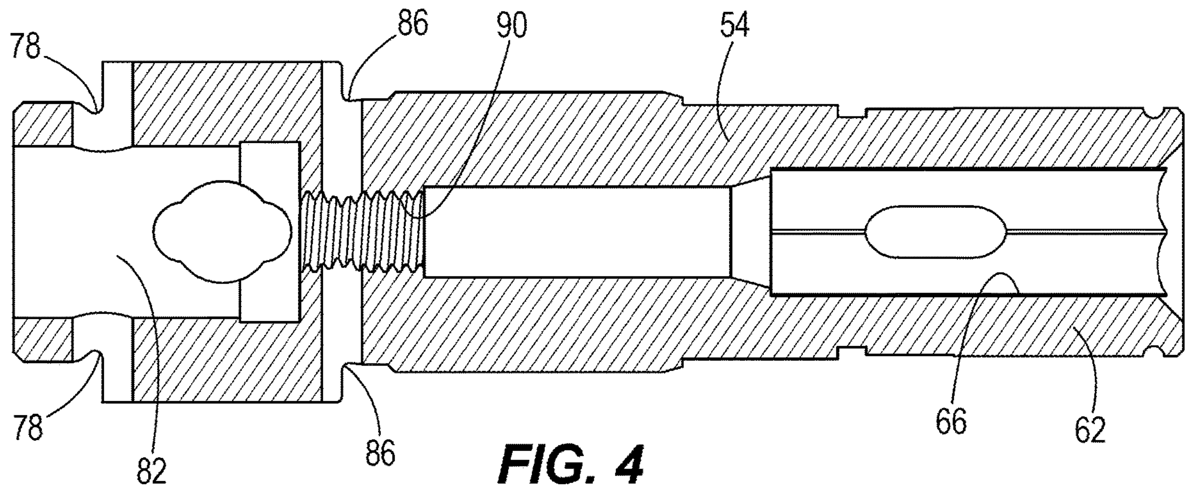
FIG. 4 is a cross-sectional view of an output shaft of the impact mechanism shown in FIG. 3.
Figure 5:
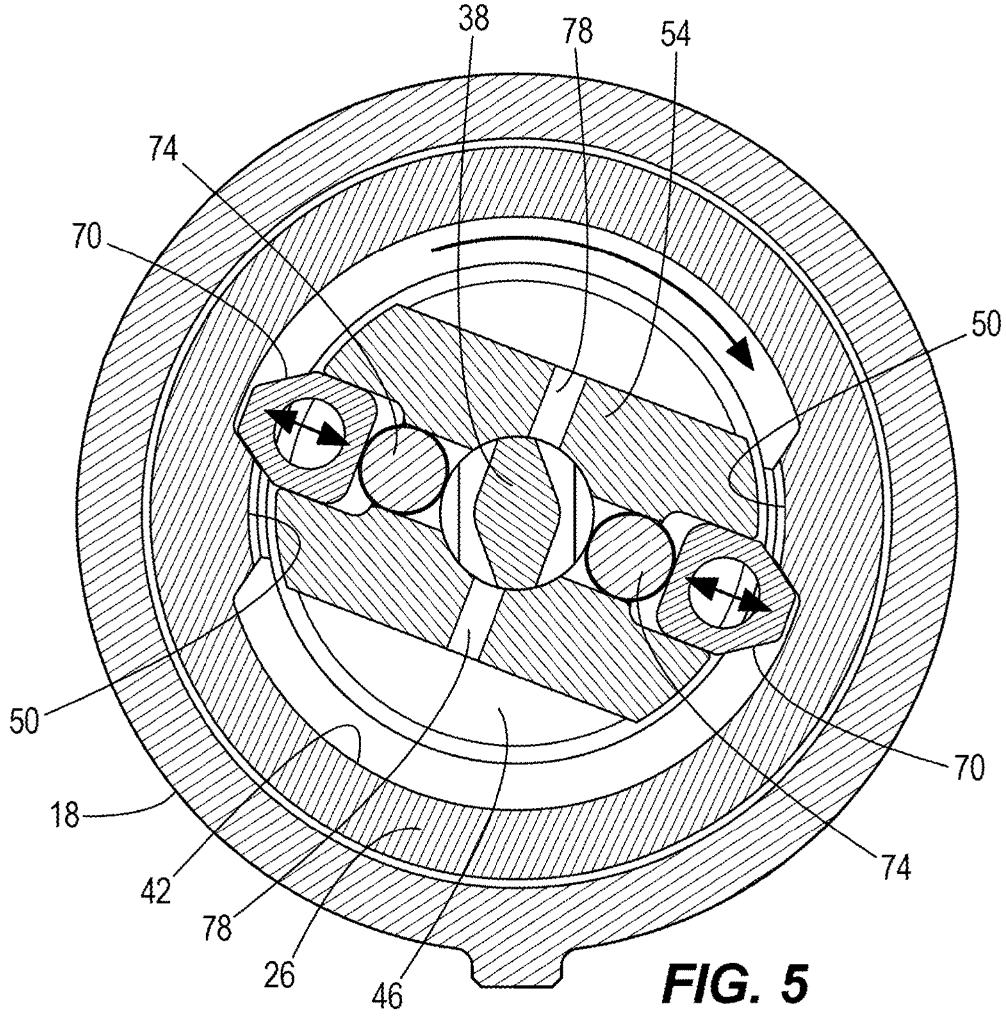
FIG. 5 is another assembled, cross-sectional view of a portion of the impact power tool of FIG. 1.

With reference to FIG. 5, the cylinder 26 includes a cylindrical interior surface 42, which partly defines a cavity 46, and a pair of radially inward-extending protrusions 50 extending from the interior surface 42 on opposite sides of the longitudinal axis 34. In other words, the protrusions 60 are spaced from each other by 180 degrees. The impact mechanism 22 further includes an output shaft 54 (FIGS. 2-4), a rear portion 58 of which is disposed within the cavity 46 and a front portion 62 of which extends from the transmission housing 18 with a hexagonal receptacle 66 (FIG. 4) therein for receipt of a tool bit. The impact mechanism 22 also includes a pair of pulse blades 70 (FIG. 3) protruding from the output shaft 54 to abut the interior surface 42 of the cylinder 26 and a pair of ball bearings 74 are positioned between the camshaft 38 and the respective pulse blades 70. The output shaft 54 has dual inlet orifices 78 (FIG. 4), each of which extends between and selectively fluidly communicates the cavity 46 and a separate high pressure cavity 82 within the output shaft 54. The output shaft 54 also includes dual outlet orifices 86 (FIG. 4) that are variably obstructed by an orifice screw 90 (FIGS. 2 and 3), thereby limiting the volumetric flow rate of hydraulic fluid that may be discharged from the output shaft cavity 82, through the orifices 86, and to the cylinder cavity 46. The camshaft 38 is disposed within the output shaft cavity 82 and is configured to selectively seal the inlet orifices 78.

Figure 2:
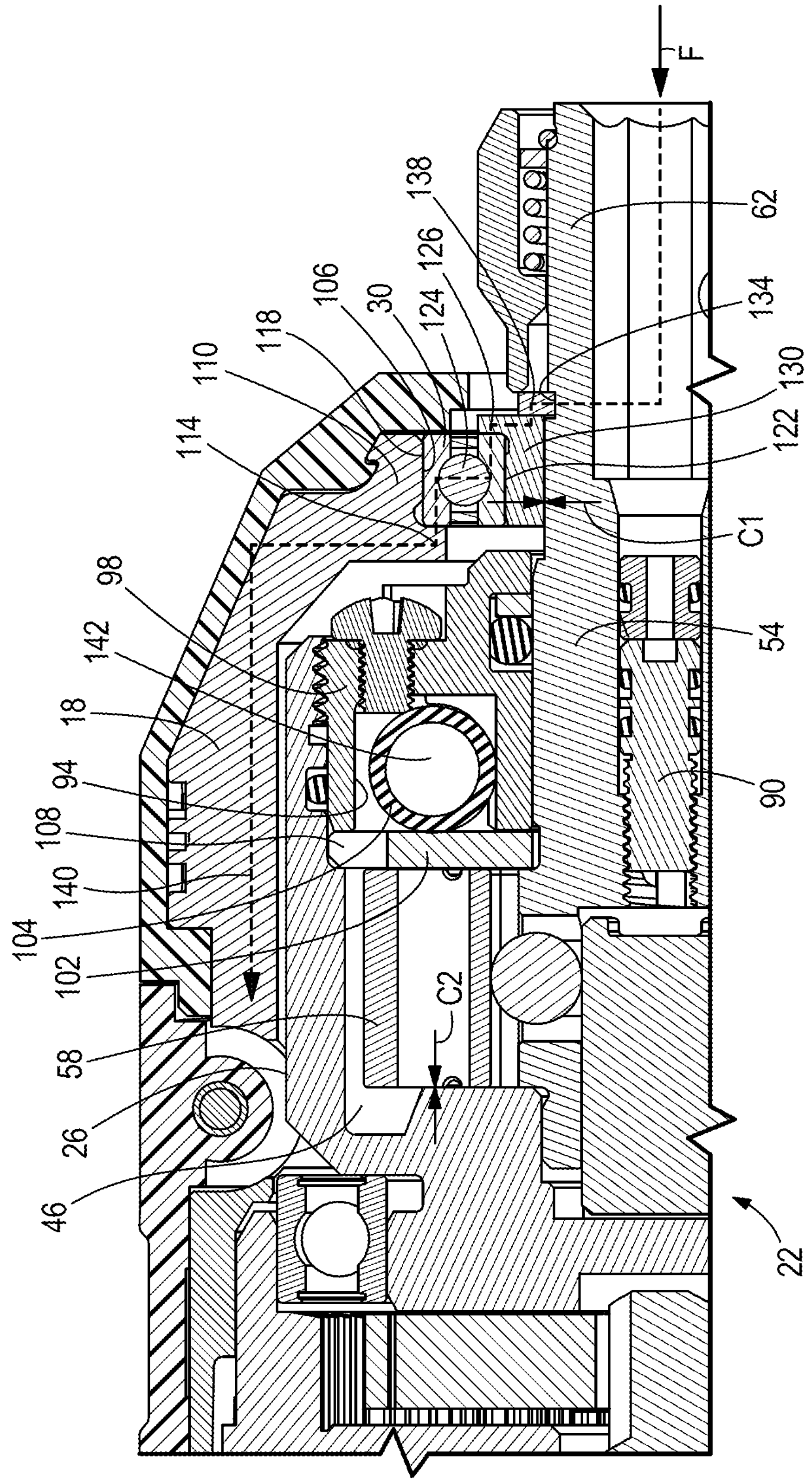
FIG. 2 is an assembled, cross-sectional view of a portion of the impact power tool of FIG. 1.
Figure 7:
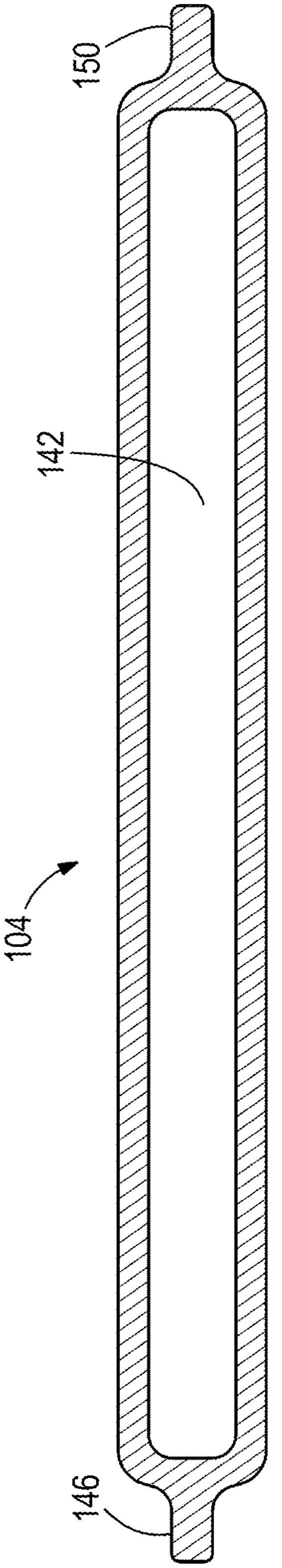
FIG. 7 is a cross-sectional view of the collapsible air bladder of FIG. 6.

With reference to FIG. 2, the cavity 46 is in communication with a bladder cavity 94, defined by an end cap 98 attached for co-rotation with the cylinder 26 (collectively referred to as a "cylinder assembly"), located adjacent the cavity 46 and separated by a plate 102 having apertures 108 for communicating hydraulic fluid between the cavities 46, 94. A collapsible bladder 104 having an interior volume 142 (FIG. 7) filled with a gas, such as air at atmospheric temperature and pressure, is positioned within the bladder cavity 94. The bladder 104 is configured to be collapsible to compensate for thermal expansion of the hydraulic fluid during operation of the impact mechanism 22, which can negatively impact performance characteristics.

Figure 6:
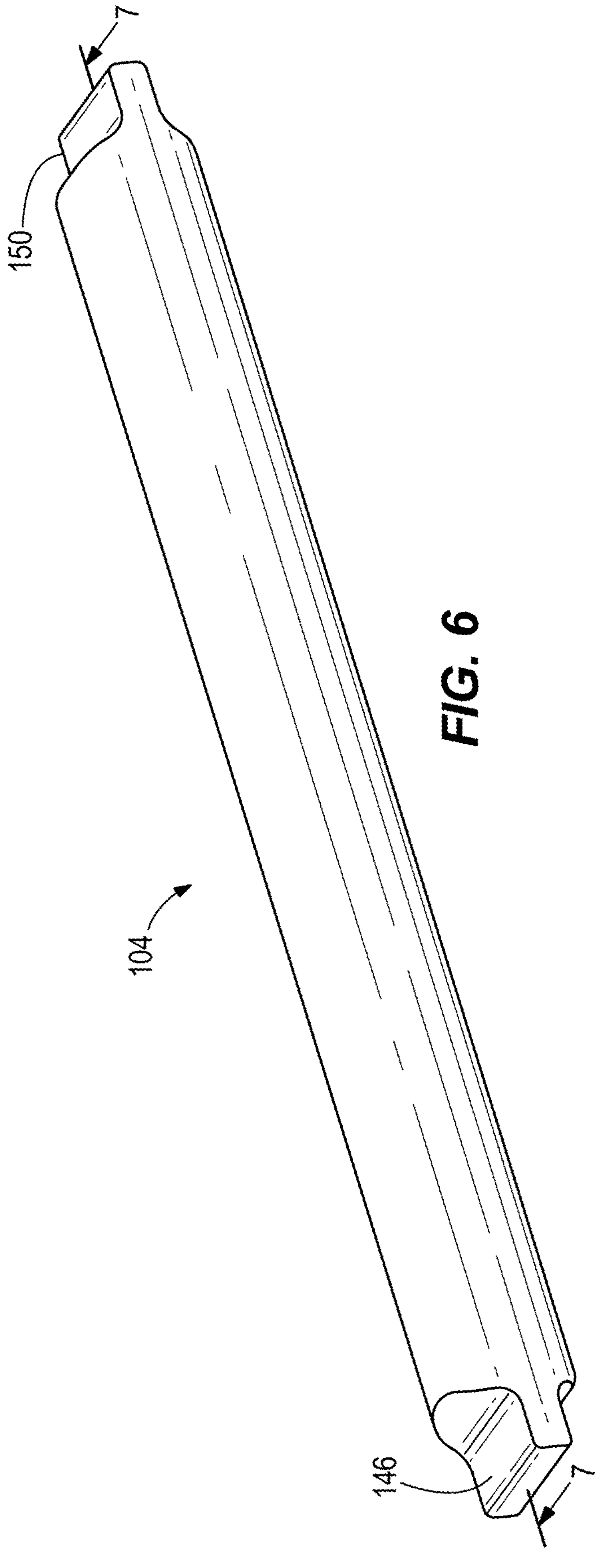
FIG. 6 is perspective view of a collapsible air bladder of the impact mechanism.

The collapsible bladder 104 can be formed from rubber or any other suitable elastomer. As one example, the collapsible bladder 104 is formed from Fluorosilicone rubber, having a Shore A durometer of 75+/−5. To form the collapsible bladder 104, the rubber is extruded to form a generally straight, hollow tube with opposite open ends. The hollow tube then undergoes a post-manufacturing vulcanizing process, in which the open ends are also heat-sealed or heat-staked to close both ends. In this manner, the opposite ends are closed without leaving a visible seam where the open ends had previously existed (see FIGS. 6 and 7), and without using an adhesive to close the two previously-open opposite ends. During the scaling process, a gas, such as air at atmospheric temperature and pressure, is trapped within the interior volume 142 defined between a first closed end 146 and second closed end 150 of the collapsible bladder 104 (see FIG. 7). However, the interior volume 142 may be filled with other gases. Because the closed ends 146, 150 are seamless, gas in the interior volume 142 cannot leak through the closed ends, and the likelihood that the closed ends 146, 150 reopen after repeated thermal cycles of the hydraulic fluid in the cavities 46, 94 is very low.

Figure 3:
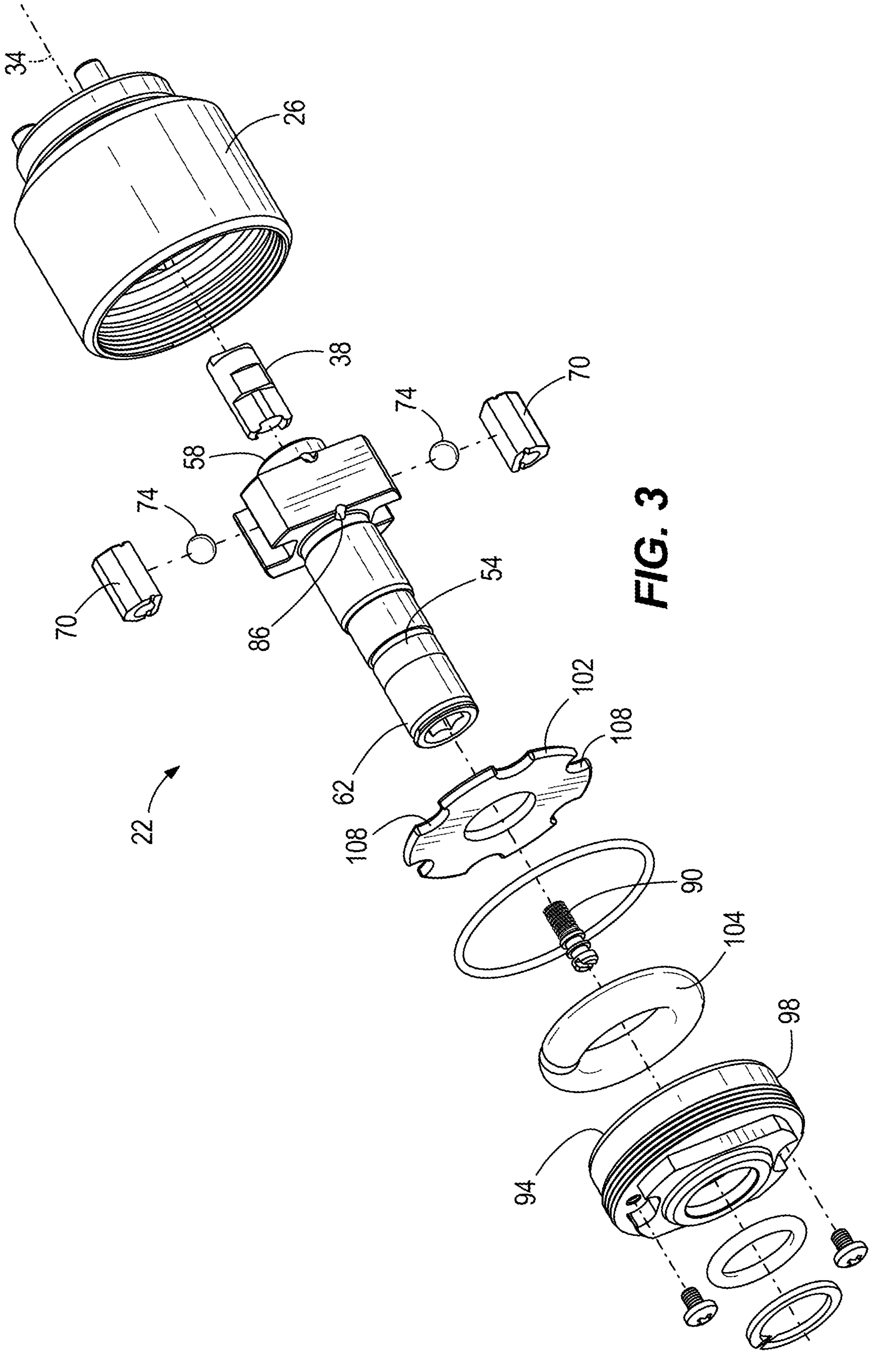
FIG. 3 is an exploded perspective view of a hydraulic torque impact mechanism of the impact power tool of FIG. 1

As shown in FIGS. 2 and 3, prior to the end cap 98 being threaded into the cylinder 26, the collapsible bladder 104 is bent into an annular shape and set into the bladder cavity 94, which is also annular. Alternatively, the collapsible bladder 104 can take any shape that permits the bladder to be set by fitment with the cavity 94 and still effectively compensate for thermal expansion of the hydraulic fluid in the cavities 46, 94. After the end cap 98 is threaded to the cylinder 26, the collapsible bladder 104 is trapped via fitment within the cavity 94, having its annular shape maintained by the shape of the cavity 94 itself.

The collapsible bladder 104 may be placed into the cavity 94 such that the first and second closed ends 146, 150 are separated by a distance within the cavity 94, meet within the cavity 94, or overlap within the cavity 94. Regardless of what shape the collapsible bladder 104 takes and regardless of the spatial relationship between the first and second closed ends 146, 150, the first and second closed ends 146, 150 remain independent and disconnected from each other. In other words, the closed ends 146, 150 of the bladder 104 are not connected or otherwise unitized (e.g., using an adhesive) to define a contiguous ring. Alternatively, the closed ends 146, 160 may be permanently joined using a heat-scaling or a heat-staking process to interconnect the closed ends 146, 160, thereby forming a ring for insertion into the annular cavity 94.

With reference to FIG. 2, the transmission housing 18 includes a bearing pocket 106 that is open at the front of the transmission housing 18 in which a bearing 30 is received for rotatably supporting the output shaft 54. The bearing pocket 106 is defined by a cylindrical, axially extending rim 110 protruding from the front of the transmission housing and a radially inward-extending flange 114 adjacent the rim 110. In the illustrated embodiment of the impact driver, the bearing 30 is configured as a radial spherical-roller bearing having an outer race 118 interference-fit to the bearing pocket 106 and abutted against the radially inward-extending flange 114 of the transmission housing 18, and an inner race 122 separated from the outer race by spherical rollers 124. Alternatively, the bearing 30 may have non-spherical rollers (e.g., cylindrical rollers). Or, the rollers may be omitted entirely, with the bearing 30 being configured as a solid bushing.

With continued reference to FIG. 2, the impact driver 10 further includes a radially outward-extending flange 126 that radially overlaps at least a portion of the bearing 30 and that is located on an opposite side of the bearing 30 as the radially inward-extending flange 114. Specifically, the outer race 118 of the bearing is adjacent and in abutting relationship with the radially inward-extending flange 114 and the inner race 122 of the bearing is overlapped by the radially outward-extending flange 126. In the illustrated embodiment, the radially outward-extending flange 126 is integrally formed with a cylindrical sleeve 130 which, in turn, is disposed between the inner race 122 of the bearing 30 and the output shaft 54. The sleeve 130 functions as a spacer to take up the radial gap between the output shaft 54 and the inner race 122 of the bearing. And, a nominal radial clearance C1 is maintained between the output shaft 54 and the sleeve 130, whereas the sleeve 130 is interference-fit to the inner race 122 of the bearing 30.

The output shaft 54 includes a circumferential groove 134 immediately forward of the sleeve 130, and a clip 138 (e.g., a C-clip) is axially affixed to the output shaft 54 within the groove 134. Because a nominal clearance C1 exists between the output shaft 54 and the sleeve 130, the clip 138 is abuttable with the radially outward-extending flange 126 on the sleeve 130 in response to rearward displacement of the output shaft 54 (i.e., to the left from the frame of reference of FIG. 2). Such rearward displacement of the output shaft 54 would occur in response to the application of a reaction force on the output shaft 54 during a fastener driving operation. As a result of the radial overlap between the radially outward-extending flange 126 and the inner race 122 of the bearing, a line of action 140 of such a reaction force F is directed through the clip, the radially outward-extending flange 126 of the sleeve, the bearing 30, and to the radially inward-extending flange 114 of the transmission housing.

In another embodiment of the impact driver 10, the clip can be omitted and the sleeve 130 can be axially affixed to the output shaft 54 (e.g., with an interference fit). In this embodiment, the line of action of an axial reaction force F on the output shaft 54 would be directed through the radially outward-extending flange 126 of the sleeve, the bearing 30, and to the radially inward-extending flange 114 of the transmission housing.

In yet another embodiment of the impact driver 10, the clip 138 may be employed but the sleeve 130 is removed, such that the bearing 30 itself is in direct contact with the output shaft 54, allowing a nominal radial clearance therebetween. In this embodiment, the diameter of the clip 138 would be sufficiently large to radially overlap at least a portion of the bearing 30, thereby performing the function of the radially outward-extending flange 126 described above. Therefore, in this embodiment, the line of action of an axial reaction force F on the output shaft 54 would be directed through the clip 138 (functioning as the radially outward-extending flange), the bearing 30, and to the radially inward-extending flange 114 of the transmission housing 18.

Figure 8:
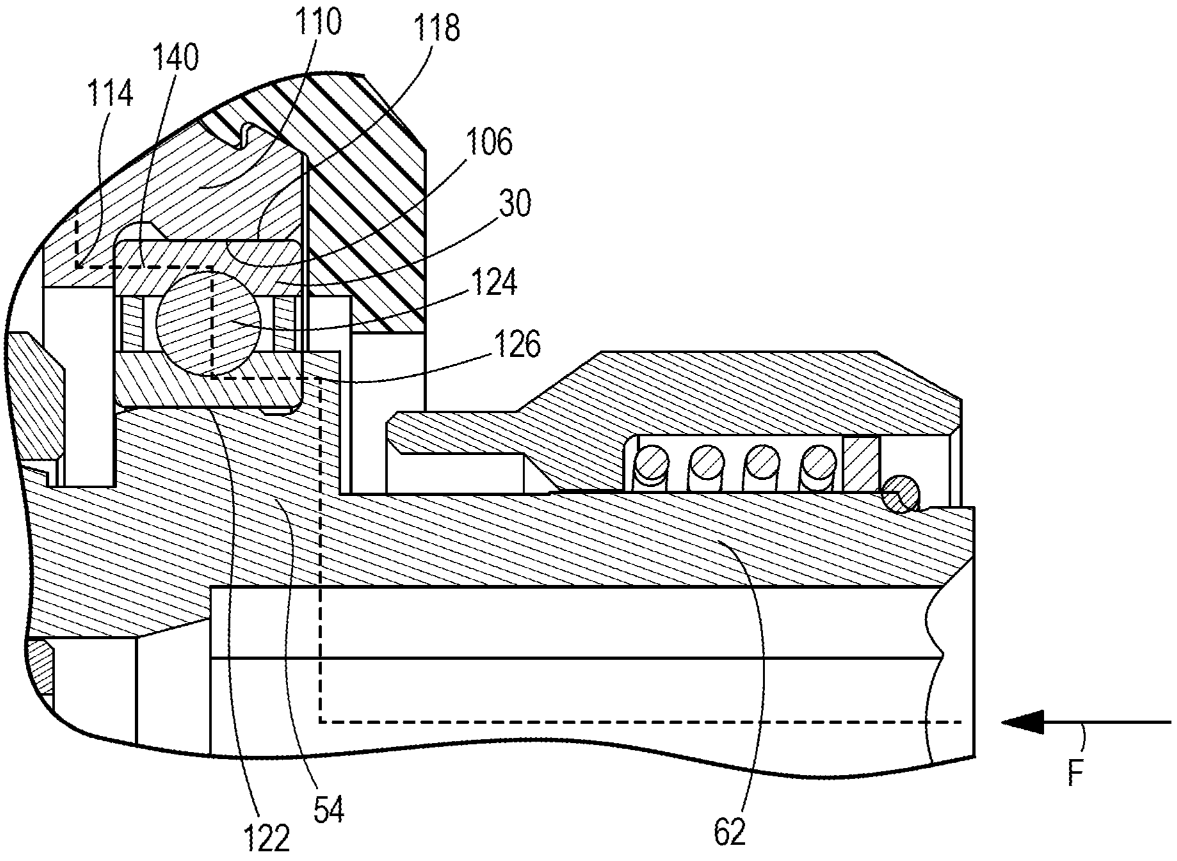
FIG. 8 is an enlarged, cross-sectional view of a portion of another embodiment of the impact power tool of FIG. 1.

In a further embodiment of the impact driver shown in FIG. 8, both the sleeve 130 and the clip 138 can be omitted, and the radially outward-extending flange 126 would be integrally formed as a single piece with the output shaft 54. For example, the radially outward-extending flange 126 may be defined by a shoulder on the output shaft 54 in front of the bearing 30 (from the frame of reference of FIG. 2) having a larger diameter than the portion of the output shaft 54 supported by the bearing 30. Therefore, in this embodiment, the line of action of an axial reaction force F on the output shaft 54 would be directed through the shoulder (functioning as the radially outward-extending flange 126), the bearing 30, and to the radially inward-extending flange 114 of the transmission housing 18.

In operation, upon activation of the electric motor 24 (e.g., by depressing a trigger), torque from the motor 24 is transferred to the cylinder 26 via the transmission, causing the cylinder 26 and camshaft 38 to rotate in unison relative to the output shaft 54 until the protrusions 50 on the cylinder 26 impact the respective pulse blades 70 to deliver a first rotational impact to the output shaft 54 and the workpiece (e.g., a fastener) upon which work is being performed. Just prior to the first rotational impact, the inlet orifices 78 are blocked by the camshaft 38, thus sealing the hydraulic fluid in the output shaft cavity 82 at a relatively high pressure, which biases the ball bearings 74 and the pulse blades 70 radially outward to maintain the pulse blades 70 in contact with the interior surface 42 of the cylinder. For a short period of time following the initial impact between the protrusions 50 and the pulse blades 70 (e.g., 1 ms), the cylinder 26 and the output shaft 54 rotate in unison to apply torque to the workpiece.

Also at this time, hydraulic fluid is discharged through the outlet orifices 86 at a relatively slow rate determined by the position of the orifice screw 90, thereby damping the radial inward movement of the pulse blades 70. Once the ball bearings 74 have displaced inward by a distance corresponding to the size of the protrusions 50, the pulse blades 70 move over the protrusions 50 and torque is no longer transferred to the output shaft 54. The camshaft 38 rotates independently of the output shaft 54 again after this point, and moves into a position where it no longer seals the inlet orifices 78 thereby causing fluid to be drawn into the output shaft cavity 82 and allowing the ball bearings 74 and pulse blades 70 to displace radially outward once again. The cycle is then repeated as the cylinder 26 continues to rotate, with torque transfer occurring twice during each 360 degree revolution of the cylinder. In this manner, the output shaft 54 receives discrete pulses of torque from the cylinder 26 and is able to rotate to perform work on a workpiece (e.g., a fastener).

As the output shaft 54 is rotated and the front portion 62 of the output shaft supporting a tool bit is applied to a surface or object (e.g., a fastener), an axial reaction force F from the object or surface is directed along the output shaft 54 in a rearward axial direction along a line of action 140 as shown in FIG. 2. In the illustrated embodiment of the impact driver 10, the line of action 140 of the axial reaction force F is directed through the output shaft 54 to the clip 138, the radially outward-extending flange 126 on the sleeve, the bearing 30, and to the radially inward-extending flange 114 of the transmission housing 18, which is affixed to the main housing 14. Because the main housing 14 is grasped by the user, the axial reaction force F is thereafter absorbed by the user's hand. As discussed above, there are a variety of options to implement the radially outward extending flange 126, using the clip 138, the sleeve 130, a shoulder on the output shaft 54, or any combination thereof. Each of these options results in the radially outward-extending flange overlapping at least a portion of the bearing 30, thereby directing the line of action 140 of the axial reaction force F applied to the output shaft 54 through the bearing 30 and to the radially inward extending flange 114 of the transmission housing 18, where the axial reaction force is ultimately absorbed by the user's grasp on the main housing 14.

Because the axial reaction force is directed to the transmission housing 18 via the radially outward-extending flange 126, axial movement of the output shaft 54 relative to the cylinder 26 is limited. This prevents inadvertent and undesirable contact between the rear portion 58 of the output shaft 54 and the cylinder 26 which might otherwise create friction and increase the current draw of the motor 24, potentially causing a premature shut down of the impact driver 10. Instead, because the axial reaction force F is directed to the transmission housing 18 via the radially outward-extending flange 126, a nominal axial clearance C2 is maintained between the rear portion 58 of the output shaft 54 and the cylinder 26. This allows the cylinder 26 to spin freely about the output shaft 54, which allows the impact driver 10 to operate more effectively and efficiently.

Various features of the invention are set forth in the following claims.

What is claimed is:

1. An impact power tool comprising:

a motor;

an output shaft to which a tool bit is attachable for performing work on a workpiece; and an impact mechanism disposed between the motor and the output shaft for converting a continuous torque output from the motor to discrete pulses of torque upon the output shaft, the impact mechanism including a cylinder assembly, a cavity defined within the cylinder assembly containing a hydraulic fluid, and a collapsible member having a first end and a second end opposite the first end, the collapsible member being maintained in a shape coinciding with that of the cavity by fitment within the cavity, with the first and second ends being disconnected from each other; and wherein the collapsible member is collapsible to compensate for thermal expansion of the hydraulic fluid during operation of the impact mechanism.

2. The impact power tool of claim 1, wherein the collapsible member contains a gas.

3. The impact power tool of claim 2, wherein the gas is air.

4. The impact power tool of claim 1, wherein the cavity is a first cavity and the cylinder assembly includes a cylinder defining a second cavity, and wherein the impact mechanism further includes a plate disposed between the first cavity and the second cavity to retain the collapsible member within the first cavity.

5. The impact power tool of claim 1, wherein the collapsible member is made of an elastomer.

6. An impact power tool comprising:

a motor;

an output shaft to which a tool bit is attachable for performing work on a workpiece; and an impact mechanism disposed between the motor and the output shaft for converting a continuous torque output from the motor to discrete pulses of torque upon the output shaft, the impact mechanism including a cylinder assembly including a cylinder and an end cap attached for co-rotation with the cylinder, a first cavity at least partly defined by an interior surface of the cylinder and containing a hydraulic fluid, a blade extending from the output shaft to abut the interior surface of the cylinder, a second cavity in communication with the first cavity, and a collapsible member positioned within the second cavity, the collapsible member having a first end and a second end, with the first and second ends being disconnected from each other;

wherein the collapsible member is collapsible to compensate for thermal expansion of the hydraulic fluid during operation of the impact mechanism.

7. The impact power tool of claim 6, wherein the first and second ends are seamless.

8. The impact power tool of claim 6, wherein the collapsible member contains a gas.

9. The impact power tool of claim 6, wherein the impact mechanism further includes a plate disposed between the first cavity and the second cavity, the plate including apertures communicating the hydraulic fluid between the first and second cavities.

10. The impact power tool of claim 6, wherein the collapsible member is bent into a curved shape corresponding with a shape of the second cavity.

11. The impact power tool of claim 6, wherein the collapsible member is made of an elastomer.

12. The impact power tool of claim 6, wherein the second cavity is defined by the end cap.

13. An impact power tool comprising:

a motor;

an output shaft to which a tool bit is attachable for performing work on a workpiece; and an impact mechanism disposed between the motor and the output shaft for converting a continuous torque output from the motor to discrete pulses of torque upon the output shaft, the impact mechanism including a cylinder assembly, a cavity defined within the cylinder assembly containing a hydraulic fluid, and a collapsible member having a first end, a second end opposite the first end, and a gas trapped within an interior volume of the collapsible member defined between the first and second ends, wherein the collapsible member is bent into a curved shape, with the first and second ends being disconnected from each other; and wherein the collapsible member is collapsible to compensate for thermal expansion of the hydraulic fluid during operation of the impact mechanism.

14. The impact power tool of claim 13, wherein the curved shape of the collapsible member is maintained by fitment of the collapsible member within the cavity.

15. The impact power tool of claim 13, wherein the first and second ends are seamless.

16. The impact power tool of claim 13, wherein the gas is air.

17. The impact power tool of claim 13, wherein the cavity is a first cavity and the cylinder assembly includes a cylinder defining a second cavity and a cap coupled to the cylinder for co-rotation therewith.

18. The impact power tool of claim 17, wherein the impact mechanism further includes a plate disposed between the first cavity and the second cavity, the plate including apertures communicating the hydraulic fluid between the first and second cavities.

19. The impact power tool of claim 18, wherein the collapsible member is made of an elastomer.

20. The impact power tool of claim 18, further comprising a transmission positioned between the motor and the impact mechanism such that the cylinder is coupled for co-rotation with an output of the transmission, wherein the impact mechanism further includes a camshaft coupled for co-rotation with the cylinder, a pair of blades extending from the output shaft to abut an interior surface of the cylinder, and a pair of ball bearings positioned between the camshaft and the pair of blades.

* * * * *